US012775909B2

(12) United States Patent
Ginn et al.

(10) Patent No.: US 12,775,909 B2
(45) Date of Patent: Oct. 27, 2026

(54) INTERMODAL INVENTORY MANAGEMENT SYSTEMS AND METHODS

(71) Applicant: BNSF Railway Company, Fort Worth, TX (US)

(72) Inventors: Edward N. Ginn, Grand Prairie, TX (US); Donald R. Dunn, Colleyville, TX (US); Joyce L. Verslype, Frisco, TX (US); Gregory E. Kolesar, Fort Worth, TX (US); Mitchel Varela, Lakewood, CO (US)

(73) Assignee: BNSF Railway Company

( * ) Notice: Subject to any disclaimer, the term of this patent is extended or adjusted under 35 U.S.C. 154(b) by 317 days.

(21) Appl. No.: 18/504,817

(22) Filed: Nov. 8, 2023

(65) Prior Publication Data

US 2025/0148415 A1 May 8, 2025

(51) Int. Cl.
*G06Q 10/087* (2023.01)
*G06Q 10/0833* (2023.01)
*G06V 20/62* (2022.01)

(52) U.S. Cl.
CPC ....... *G06Q 10/087* (2013.01); *G06Q 10/0833* (2013.01); *G06V 20/63* (2022.01)

(58) Field of Classification Search
CPC .. G06Q 10/087; G06Q 10/0833; G06Q 10/08; G06V 20/63
See application file for complete search history.

(56) References Cited

U.S. PATENT DOCUMENTS 11,688,169 B1 6/2023 Dryer et al.
2011/0050397 A1 3/2011 Cova
2019/0069139 A1 2/2019 Seaman et al.
2019/0087772 A1 3/2019 Medina et al.
2020/0160553 A1 5/2020 Seaman et al.
2020/0349501 A1 11/2020 Ayoub et al.
(Continued)

OTHER PUBLICATIONS

Litum; Yard Management: Improve material handling processes and turnaround times with Litum Yard Management RTLS, Feb. 22, 2023 (Year: 2023).
(Continued)

*Primary Examiner* — A. Hunter Wilder

(74) *Attorney, Agent, or Firm* — Whitaker Chalk Swindle & Schwartz PLLC; Bradley J. Birchfield; Enrique Sanchez, Jr.

(57) ABSTRACT

According to some embodiments, a method includes accessing yard check data received from a plurality of sources. The yard check data includes a unit identification number of a particular shipping container of a plurality of shipping containers, a location of the particular shipping container within a container yard, and a confidence level. The method further includes storing the unit identification number and the location of the particular shipping container in a unit inventory of an inventory database. The method further includes comparing the confidence level of the particular message to a confidence threshold for the particular source. The method further includes electronically communicating, across a communications network, the unit identification number and the location of the particular shipping container for storage in a production database when the confidence level of the particular message exceeds the confidence threshold for the particular source.

18 Claims, 6 Drawing Sheets

(56) References Cited

U.S. PATENT DOCUMENTS

| | | | | |
|---|---|---|---|---|
| 2021/0365680 | A1 | 11/2021 | Mossberg et al. | |
| 2025/0069400 | A1* | 2/2025 | Kelly | G06T 7/73 |

OTHER PUBLICATIONS

International Search Report and Written Opinion issued by the European Patent Office for PCT/US2024/052213; dated Jan. 14, 2025; 13 pages.

* cited by examiner

INTERMODAL INVENTORY MANAGEMENT SYSTEMS AND METHODS

TECHNICAL FIELD

This disclosure generally relates to intermodal logistics, and more specifically to intermodal inventory management systems and methods.

BACKGROUND

An intermodal container yard can be a facility in which shipping containers are transferred between trucks and trains. Most intermodal container yards include large storage areas where shipping containers are stored. For example, a truck may enter an intermodal container yard and be instructed to park a trailer containing a shipping container in a designated parking spot. For various reasons, however, a truck driver may not park a shipping container in the requested parking location. As a result, a "yard check" may be utilized by the intermodal container yard to ensure that shipping containers can be located when needed for loading on a train. Yard checks are typically performed by workers that visually observe the units within a yard (e.g., trailers, containers, etc.) and their locations (e.g., lot/row/spots) and manually enter the observed information in an inventory database. Manual yard checks, however, are time consuming, monotonous, and prone to frequent errors.

SUMMARY

The present disclosure achieves technical advantages as systems, methods, and computer-readable storage media that provide functionality for managing inventory such as intermodal inventory of a rail yard. The present disclosure provides for a system integrated into a practical application with meaningful limitations that may include accessing yard check data received from a plurality of sources such as aerial or ground vehicles. The yard check data includes a unit identification number of a particular shipping container of a plurality of shipping containers, a location of the particular shipping container within a container yard, and a confidence level. Other meaningful limitations of the system integrated into a practical application include: storing the unit identification number and the location of the particular shipping container in a unit inventory of an inventory database; comparing the confidence level of the particular message to a confidence threshold for the particular source; and electronically communicating, across a communications network, the unit identification number and the location of the particular shipping container for storage in a production database when the confidence level of the particular message exceeds the confidence threshold for the particular source.

The present disclosure solves the technological problem of a lack of technical functionality for rail yard checks in current systems by providing methods and system that automatically determine the identifications and locations of shipping containers within a rail yard and then automatically determine when to store the determined identifications and locations within a production database. The technological solutions provided herein, and missing from conventional systems, are more than a mere application of a manual process to a computerized environment, but rather include functionality to implement a technical process to supplement current manual solutions for performing yard checks and to augment current inventory systems by providing a mechanism for automatically determining when to store the determined identifications and locations within a production database. In doing so, the present disclosure goes well beyond a mere application the manual process to a computer.

Unlike existing solutions where personnel may be required to manually traverse a rail yard and manually enter identifications and locations of shipping containers parked in the rail yard, embodiments of this disclosure provide systems and methods that automatically determine the identifications and locations of shipping containers within a rail yard (e.g., using aerial or ground-based vehicles) and then automatically determine when to store the determined identifications and locations within a production database. By providing automatic determination and validation of shipping container inventory and locations, a facility such as a rail yard may be more efficiently and effectively monitored. This may increase the efficiency of the facility and reduce or eliminate the requirement for personnel to manually perform yard checks. This may reduce resource usage (e.g., fuel and electricity) that would otherwise be required by manual yard checks. Furthermore, by providing systems that automatically determine when to store the identifications and locations of shipping containers within a production database, network bandwidth and computer resources (e.g., computer memory and processing power) may be optimized or reduced by not having to be reserved for inaccurate data. Other technical advantages will be readily apparent to one skilled in the art from the following figures, descriptions, and claims. Moreover, while specific advantages have been enumerated above, various embodiments may include all, some, or none of the enumerated advantages.

Accordingly, the present disclosure discloses concepts inextricably tied to computer technology such that the present disclosure provides the technological benefit of implementing functionality to automatically manage inventory such as intermodal inventory of a rail yard. The systems and techniques of embodiments provide improved systems by providing capabilities to perform functions that are currently performed manually and to perform functions that are currently not possible.

It is an object of the disclosure to provide a system for automatically managing inventory of physical objects such as shipping containers in a rail yard. It is a further object of the disclosure to provide methods of automatically managing inventory of physical objects such as shipping containers in a rail yard. It is still a further object of the disclosure to provide a computer-based tool for automatically managing inventory of physical objects such as shipping containers in a rail yard. These and other objects are provided by the present disclosure, including at least the following embodiments.

In one particular embodiment, a system includes an inventory database storing a unit inventory, one or more memory units storing a plurality of confidence thresholds, and one or more computer processors communicatively coupled to the inventory database and the one or more memory units. The one or more computer processors are configured to access a plurality of messages received from a plurality of yard check sources. Each of the messages include yard check data that includes a unit identification number of a particular shipping container of a plurality of shipping containers, a location of the particular shipping container within a container yard, and a confidence level associated with the identification number of the particular shipping container. For each particular message received from each particular yard check source, the one or more computer processors store the unit identification number and the location of the particular shipping container in the unit inventory of the inventory database, compare the confidence level of the particular message to a confidence threshold for the particular yard check source, and electronically communicate, across a communications network, the unit identification number and the location of the particular shipping container for storage in a production database when the confidence level of the particular message exceeds the confidence threshold for the particular yard check source.

In another embodiment, a method includes accessing yard check data received from a plurality of sources. The yard check data includes a unit identification number of a particular shipping container of a plurality of shipping containers, a location of the particular shipping container within a container yard, and a confidence level. The method further includes, for each particular message received from each particular source: storing the unit identification number and the location of the particular shipping container in a unit inventory of an inventory database; comparing the confidence level of the particular message to a confidence threshold for the particular source; and electronically communicating, across a communications network, the unit identification number and the location of the particular shipping container for storage in a production database when the confidence level of the particular message exceeds the confidence threshold for the particular source.

In another embodiment, one or more computer-readable non-transitory storage media embodies instructions that, when executed by a processor, cause the processor to perform operations that include accessing yard check data received from a plurality of sources. The yard check data includes a unit identification number of a particular shipping container of a plurality of shipping containers, a location of the particular shipping container within a container yard, and a confidence level. The operations further include, for each particular message received from each particular source: storing the unit identification number and the location of the particular shipping container in a unit inventory of an inventory database; comparing the confidence level of the particular message to a confidence threshold for the particular source; and electronically communicating, across a communications network, the unit identification number and the location of the particular shipping container for storage in a production database when the confidence level of the particular message exceeds the confidence threshold for the particular source.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which.

Figure 1:
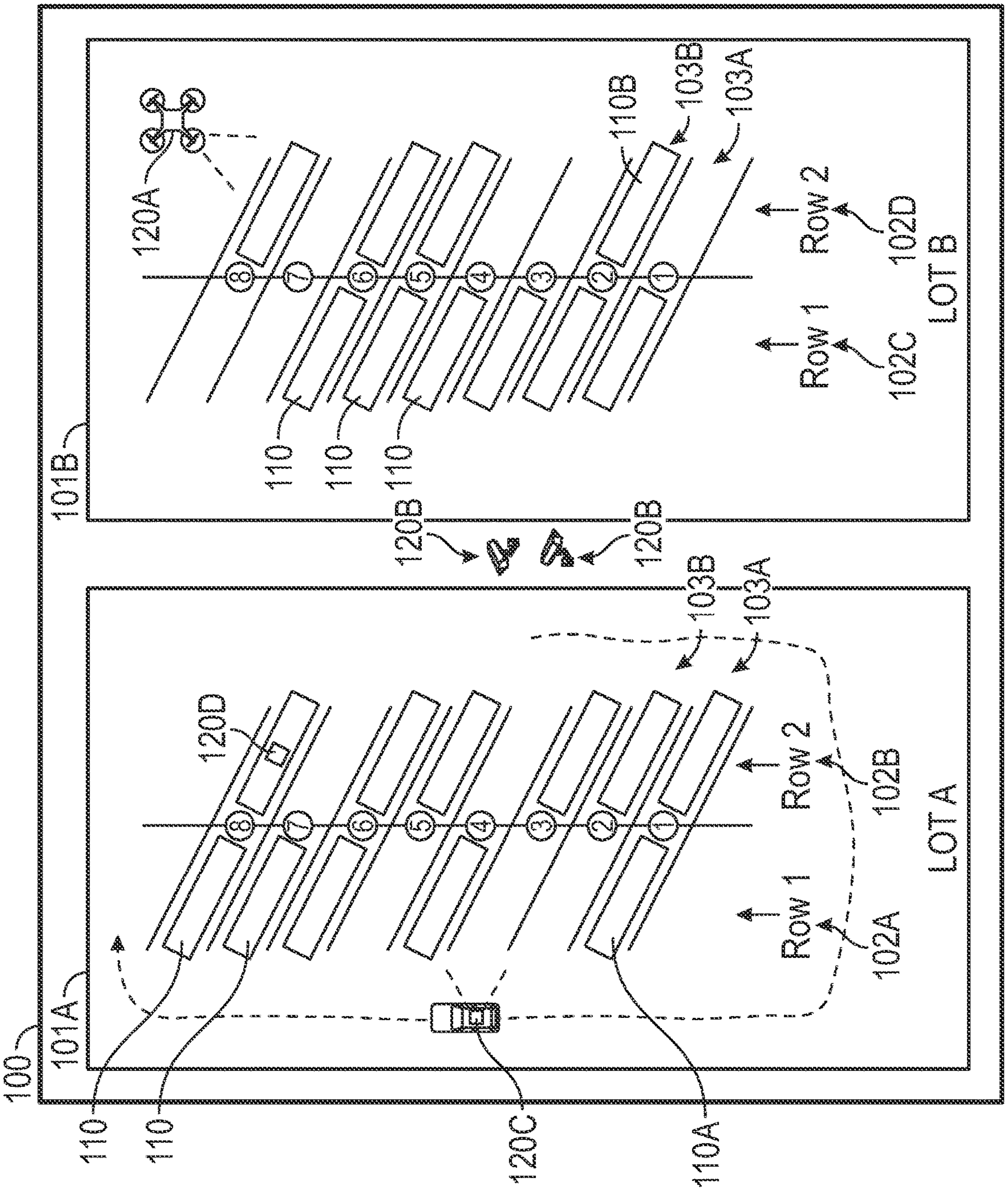
FIG. 1 is a diagram illustrating an overhead view of a container yard, according to particular embodiments.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

The disclosure presented in the following written description and the various features and advantageous details thereof, are explained more fully with reference to the non-limiting examples included in the accompanying drawings and as detailed in the description. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can recognize the members of the genus. Accordingly, these examples should not be construed as limiting the scope of the claims.

A person of ordinary skill in the art would understand that any system claims presented herein encompass all of the elements and limitations disclosed therein, and as such, require that each system claim be viewed as a whole. Any reasonably foreseeable items functionally related to the claims are also relevant. The Examiner, after having obtained a thorough understanding of the disclosure and claims of the present application has searched the prior art as disclosed in patents and other published documents, i.e., nonpatent literature. Therefore, as evidenced by issuance of this patent, the prior art fails to disclose or teach the elements and limitations presented in the claims as enabled by the specification and drawings, such that the presented claims are patentable under the applicable laws and rules of this jurisdiction.

An intermodal container yard can be a facility in which shipping containers are transferred between trucks and trains. Most intermodal container yards include vast storage areas where shipping containers are stored. For example, a truck may enter an intermodal container yard and be instructed to park a trailer containing a shipping container in a designated parking spot. For various reasons, however, a truck driver may not park a shipping container in the requested parking location. As a result, a "yard check" may be utilized by the intermodal container yard to ensure that shipping containers can be located when needed for loading on a train. Yard checks are typically performed by workers that visually observe the units within a yard (e.g., trailers, containers, etc.) and their locations (e.g., lot/row/spots) and manually enter the observed information in an inventory database. Manual yard checks, however, are time consuming, monotonous, and prone to frequent errors.

To address these and other problems with managing inventory such as shipping containers stored in intermodal container yards, the disclosed embodiments provide systems and methods for the automatic management and verification of intermodal inventory. In some embodiments, the disclosed systems and methods utilize various sources to gather data about shipping containers in a container yard. As one example, an aerial vehicle such as a drone may be used to patrol the container yard and provide unit identification numbers and locations (e.g., lot/row/slot) of the shipping containers in the container yard. As another example, a ground vehicle such as an automobile may be used to patrol the container yard and provide unit identification numbers and locations of the shipping containers in the container yard. As yet another example, a fixed camera may be used to provide unit identification numbers and locations of the shipping containers in the container yard. An automatic yard checker may then ingest the data from the various sources, provide a graphical user interface for validating/updating the data about the shipping containers provided by the various sources, and determine whether the data should be released to a production database. For example, the automatic yard checker may compare confidence levels provided by the various sources to stored confidence thresholds in order to determine whether the data should be released to the production database. As another example, the automatic yard checker may consult stored hierarchy rules in order to determine whether the data should be released to the production database. As a result, the locations of shipping containers within a container yard may be automatically maintained and provided for use by other systems. These and other features and advantages of the disclosed embodiments are discussed in more detail below.

FIG. 1 is a diagram illustrating an overhead view of a container yard 100, according to particular embodiments. In general, container yard 100 can be an area within an intermodal rail yard for storing shipping containers 110. Shipping containers 110 may be parked in a specific location that can be identified by a lot 101, a row 102, and a spot 103. For example, shipping container 110A can be parked in lot 101A ("A"), row 102A ("1"), and spot 103A ("1"). As another example, shipping container 110B can be parked in lot 101B ("B"), row 102D ("2"), and spot 103B ("2"). Shipping containers 110 may be any appropriate containers that may be transported and parked within container yard 100. In some embodiments, shipping containers 110 are intermodal shipping containers that are able to be transported by both rail and truck.

In addition to shipping containers 110, container yard 100 includes one or more yard check sources 120. In general, yard check sources 120 are devices or systems that capture and transmit yard check data 125 about shipping containers 110. In the illustrated embodiments of FIGS. 1-2, yard check sources 120 include a yard check source 120A, a yard check source 120B, a yard check source 120C, and a yard check source 120D. Yard check source 120A can be an aerial vehicle (e.g., a drone, a remote-control (RC) airplane, etc.) with one or more attached cameras. Yard check source 120B can be a ground vehicle (e.g., an automobile, a utility vehicle, an RC vehicle, etc.) with one or more attached cameras. Yard check source 120C can be a fixed camera (e.g., a camera affixed to the top of a stationary pole). Yard check source 120D can be a device (e.g., a computer, a GPS device, etc.) attached to shipping container 110 or a truck that delivers shipping container 110.

In general, yard check sources 120 are systems and devices that continuously monitor container yard 100 for shipping containers 110 and their locations. In some embodiments, yard check sources 120 (e.g., aerial yard check source 120A and ground yard check source 120B) move about container yard 100 to capture images or videos of shipping containers 110. In other embodiments, yard check sources 120 are stationary cameras (e.g., affixed to poles) that capture images or videos of shipping containers 110. Yard check sources 120 (or backend computer systems communicatively coupled to yard check sources 120) then process the captured images or videos in order determine unit identifications and locations of shipping containers 110. The determined unit identifications and locations of shipping containers 110 within container yard 100 are then provided by yard check sources 120 to intermodal inventory management system 200 as yard check data 125. Intermodal inventory management system 200 then ingests yard check data 125 from yard check sources 120 and applies various rules to validate yard check data 125 and maintain an accurate inventory of shipping container 110, as described in more detail below.

Figure 2:
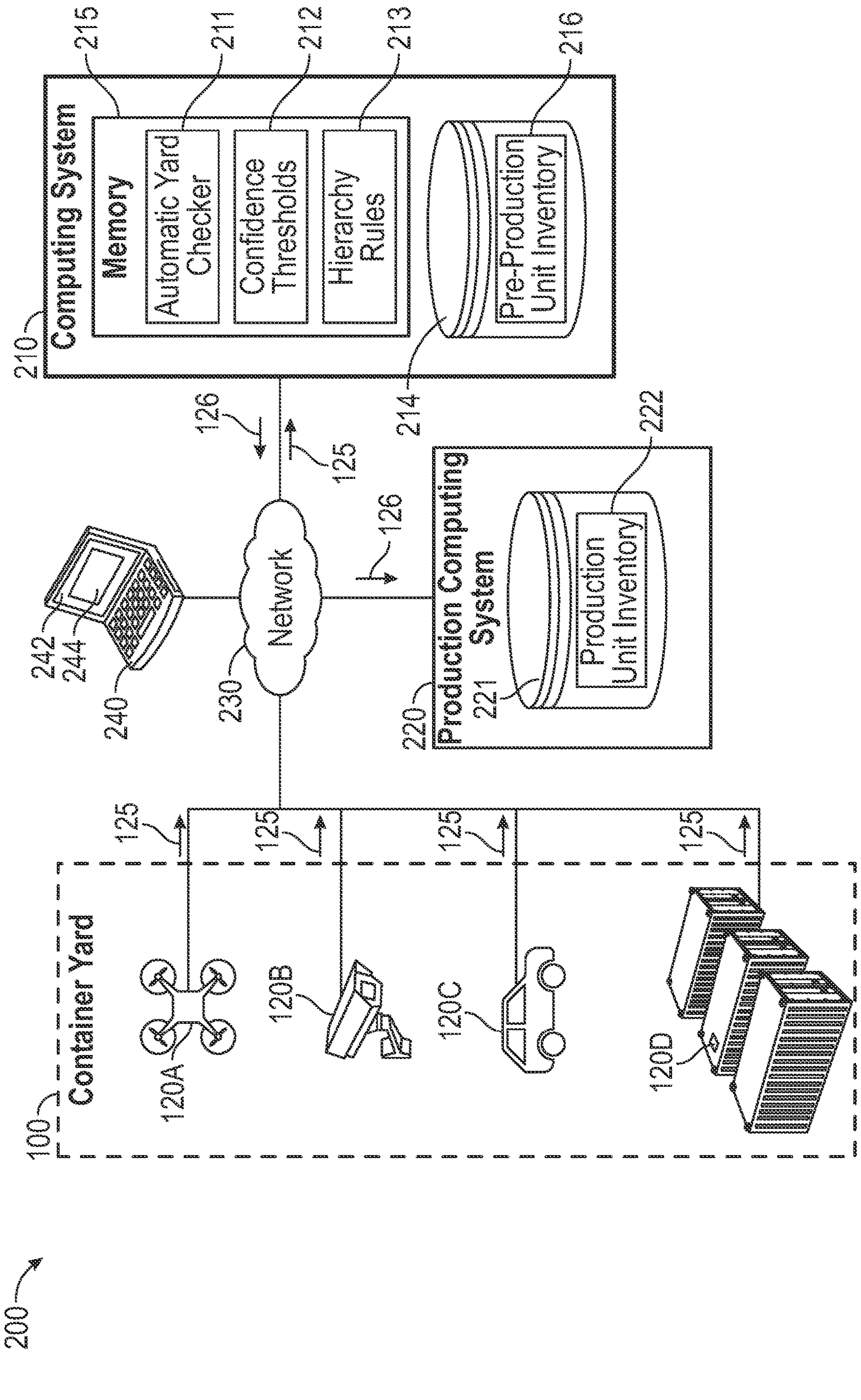
FIG. 2 is a diagram illustrating an intermodal inventory management system for managing the inventory of the container yard of FIG. 1, according to particular embodiments.

FIG. 2 is a diagram illustrating an intermodal inventory management system 200 for processing and managing the inventory of container yard 100, according to particular embodiments. Intermodal inventory management system 200 includes a computing system 210, a production computing system 220, and a user computing system 240, all of which are communicatively coupled via a network 230. Computing system 210 includes memory 215 and pre-production inventory database 214. Memory 215 stores automatic yard checker module 211, confidence thresholds 212, and hierarchy rules 213. Pre-production inventory database 214 stores pre-production unit inventory 216.

In general, automatic yard checker module 211 of computing system 210 ingests yard check data 125 from yard check sources 120 and applies confidence thresholds 212 and/or hierarchy rules 213 to yard check data 125 in order to determine the appropriate data to send to production computing system 220 for storage in production unit inventory 222. For example, automatic yard checker module 211 may receive or otherwise access yard check data 125 received from a particular yard check source 120 about the location and identification of a shipping container 110 within container yard 100. Automatic yard checker module 211 may compare a confidence level associated with the received yard check data 125 with confidence thresholds 212 in order to determine if the received yard check data 125 should be stored in production unit inventory 222. If automatic yard checker module 211 determines that the received yard check data 125 should be stored in production unit inventory 222, automatic yard checker module 211 sends the approved yard check data 126 to computing system 220 via network 230 for storage in production unit inventory 222 of production inventory database 221. More details about the operation of automatic yard checker module 211 are discussed below.

Yard check data 125 can be information provided by yard check sources 120 to intermodal inventory management system 200. In general, yard check data 125 provides information about the location of shipping containers 110 within container yard 100. In some embodiments, yard check data 125 includes a unit identification number of a particular shipping container 110 and a location of the particular shipping container 110 within container yard 100. In some embodiments, yard check data 125 additionally includes a confidence level associated with the unit identification number.

In some embodiments, yard check sources 120 provide yard check data 125 via a series of messages. For example, when yard check source 120A determines that shipping container 110A has a unit identification number of "BICU 123456" and can be located in lot/row/spot location of A-1-1 as illustrated in FIG. 1, yard check source 120A may send a message to intermodal inventory management system 200 that includes the unit identification number of "BICU 123456" and lot/row/spot location of A-1-1. As another example, when yard check source 120B determines that shipping container 110B has a unit identification number of "BICU 654321" and can be located in lot/row/spot location of B-2-2 as illustrated in FIG. 1, yard check source 120B may send a message to intermodal inventory management system 200 that includes the unit identification number of "BICU 654321" and lot/row/spot location of B-2-2. In some embodiments, the messages utilized by yard check sources 120 to send yard check data 125 to intermodal inventory management system 200 are sent via a distributed event streaming platform such as APACHE KAFKA.

Figure 3:
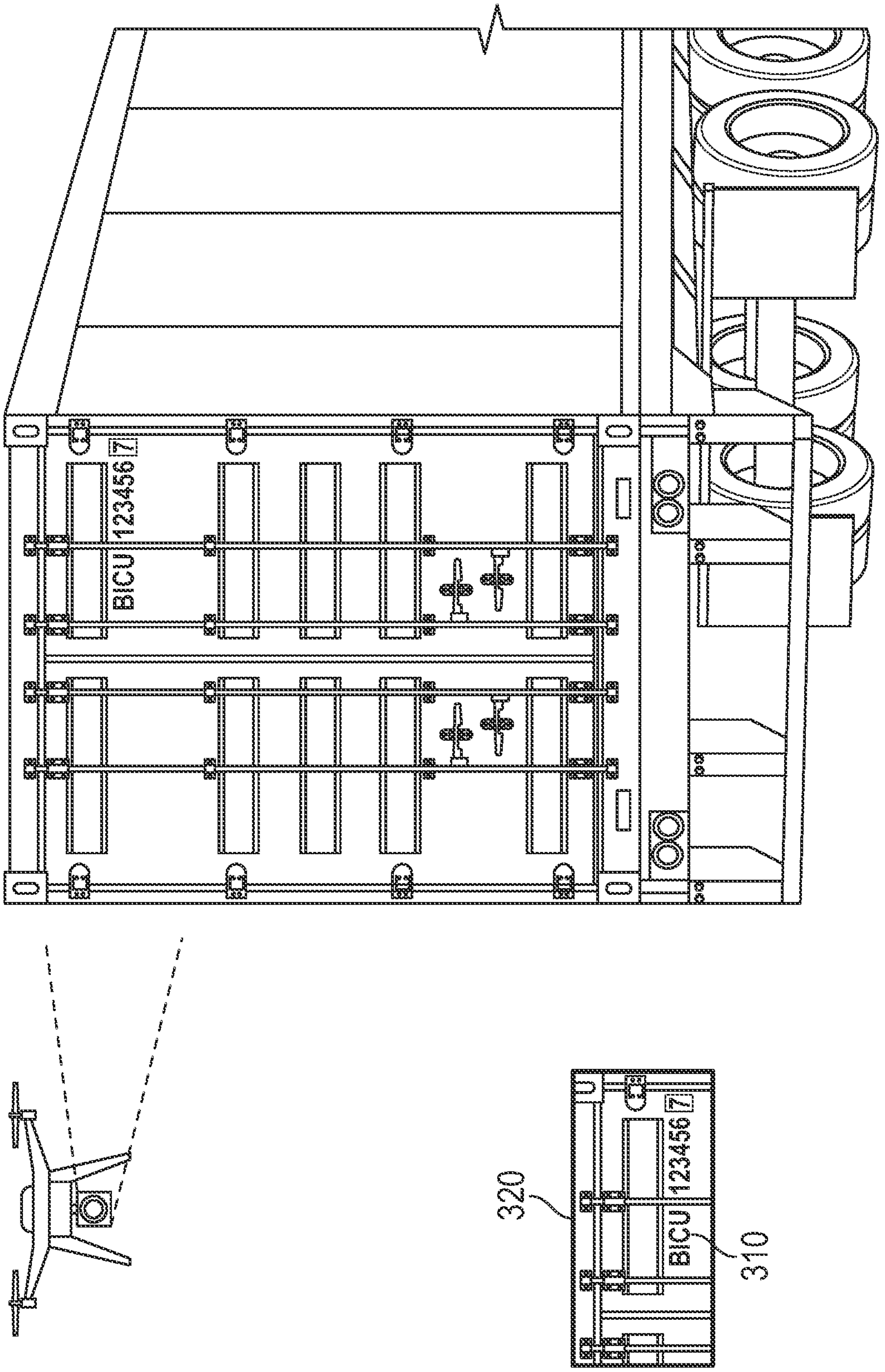
FIG. 3 is a diagram illustrating a yard check source determining a unit identification of a shipping container, according to particular embodiments.

In some embodiments, yard check sources 120 may utilize any appropriate method or algorithm for determining the unit identification numbers of shipping containers 110 to include in yard check data 125. For example, FIG. 3 illustrates yard check source 120A determining a unit identification 310 from an image 320. In this example, yard check source 120A captures image 320 of shipping container 110A and then utilizes optical character recognition (OCR) or a machine learning algorithm to analyze image 320 and determine that unit identification 310 of shipping container 110A can be "BICU 123456." In other embodiments, yard check sources 120 may utilize any other appropriate technique or technology to determine unit identifications 310 (e.g., radio frequency identification (RFID), Bluetooth, WI-FI, etc.).

In some embodiments, yard check sources 120 may utilize any appropriate method or algorithm for determining the location of shipping containers 110 to include in yard check data 125. For example, yard check source 120 may capture an image of a location label of the lot/row/spot of shipping container 110 (e.g., a label painted on the ground) and then utilize OCR to determine the lot/row/spot location of shipping container 110. In other embodiments, yard check sources 120 may utilize any other appropriate technique or technology to determine the location of shipping container 110 (e.g., a GPS transceiver, etc.).

In some embodiments, yard check sources 120 include a confidence level within yard check data 125 that can be associated with the identification number of the particular shipping container 110. In some scenarios, it may be difficult to distinguish with absolute certainty the characters of unit identification 310. This may be due to, for example, low quality images 320 (e.g., due to weather or a dirty camera lens) or the presence of characters that are notorious for being difficult to determine using OCR (e.g., "3" vs. "8", "8" vs. "B", etc.). To account for this uncertainty, yard check sources 120 may, in some embodiments, calculate a confidence level using any appropriate technique and then send the confidence level in yard check data 125 for a particular shipping container 110. In some embodiments, the confidence level may be expressed as a value between 0-100.

In some embodiments, intermodal inventory management system 200 includes an automatic yard checker module 211 that performs one or more operations described herein. Automatic yard checker module 211 represents any suitable set of instructions, logic, or code embodied in a computer-readable storage medium. For example, automatic yard checker module 211 may be embodied in memory 215, a disk, a CD, or a flash drive. In particular embodiments, automatic yard checker module 211 may include instructions (e.g., a software application) executable by processor to perform one or more of the functions described herein. Particular methods that may be performed by automatic yard checker module 211 are described in more detail below with respect to FIG. 5.

In some embodiments, automatic yard checker module 211 utilizes confidence thresholds 212 to determine which yard check data 125 to approve and send for storage in production computing system 220. In some embodiments, confidence thresholds 212 include predetermined threshold values that each correspond to a particular yard check source 120. For example, confidence thresholds 212 may include a first confidence threshold 212A that corresponds to yard check source 120A, a second confidence threshold 212B that corresponds to yard check source 120B, a third confidence threshold 212C that corresponds to yard check source 120C, a fourth confidence threshold 212D that corresponds to yard check source 120D, and so on. In some embodiments, each confidence threshold 212 may be a value between 0-100 and may be based on historical accuracy data for the corresponding yard check source 120. For example, if historical data indicates that yard check source 120A accurately determines unit identifications 310 of shipping containers 110 60% percent of the time, first confidence threshold 212A for yard check source 120A may be set to a value of around 60. As another example, if historical data indicates that yard check source 12BA accurately determines unit identifications 310 of shipping containers 110 90% percent of the time, second confidence threshold 212B for yard check source 120B may be set to a value of around 90.

In general, automatic yard checker module 211 may compare a confidence level provided by yard check source 120 for each particular unit identification 310 within yard check data 125 to the confidence threshold 212 for that particular yard check source 120. If the confidence level provided by a particular yard check source 120 meets or exceeds the confidence threshold 212 for that particular yard check source 120, the unit identification 310 and location of the particular shipping container 110 may be sent for storage in production computing system 220.

In some embodiments, automatic yard checker module 211 utilizes hierarchy rules 213 to determine which yard check data 125 to approve and send for storage in production computing system 220. In general, hierarchy rules 213 include a predetermined preferential order for yard check sources 120 in the event that multiple yard check sources 120 provide a unit identification 310 and a location for the same shipping container 110 within a predetermined amount of time (e.g., fifteen minutes). For example, hierarchy rules 213 may indicate that yard check sources 120 are selected in the following order: 1) yard check source 120A; 2) yard check source 120B; 3) yard check source 120C; and then 4) yard check source 120D. Given this example, consider the following scenarios for illustrative purposes. As a first scenario, yard check source 120A first sends yard check data 125 for shipping container 110A to computing system 210 where it can be stored in pre-production unit inventory 216 and then sent for storage in production inventory database 221. At a later point in time (but within the predetermined amount of time), yard check source 120B sends yard check data 125 for the same shipping container 110A to computing system 210. Automatic yard checker module 211 may consult hierarchy rules 213 and determine that yard check source 120B has a lower position in the hierarchy order than yard check source 120A and therefore decline to send yard check data 125 for shipping container 110A from yard check source 120B for storage in production inventory database 221. As a second scenario, yard check source 120BA first sends yard check data 125 for shipping container 110A to computing system 210 where it can be stored in pre-production unit inventory 216 and then sent for storage in production inventory database 221. At a later point in time (but within the predetermined amount of time), yard check source 120A sends yard check data 125 for the same shipping container 110A to computing system 210. Automatic yard checker module 211 may consult hierarchy rules 213 and determine that yard check source 120A has a higher position in the hierarchy order than yard check source 120B and therefore send the yard check data 125 for shipping container 110A from yard check source 120A for storage in production inventory database 221. In this second scenario, the yard check data 125 for shipping container 110A from yard check source 120A replaces the previous yard check data 125 for shipping container 110A from yard check source 120B since yard check source 120A has a superior position in hierarchy rules 213 than yard check source 120B.

Pre-production inventory database 214 of computing system 210 may store certain types of information for computing system 210 and automatic yard checker module 211. Pre-production inventory database 214 may be any one or a combination of volatile or non-volatile local or remote devices suitable for storing information. Pre-production inventory database 214 may include RAM, ROM, magnetic storage devices, optical storage devices, or any other suitable information storage device or a combination of these devices. Pre-production inventory database 214 may be a component external to computing system 210. Pre-production inventory database 214 may be located in any location suitable for pre-production inventory database 214 to store information for computing system 210. For example, pre-production inventory database 214 may be located in a cloud environment. In general, pre-production inventory database 214 stores pre-production unit inventory 216, which includes yard check data 125 and images/videos received from yard check sources 120.

Production inventory database 221 of production computing system 220 may store certain types of information for production computing system 220. Production inventory database 221 may be any one or a combination of volatile or non-volatile local or remote devices suitable for storing information. Production inventory database 221 may include RAM, ROM, magnetic storage devices, optical storage devices, or any other suitable information storage device or a combination of these devices. Production inventory database 221 may be a component external to production computing system 220. Production inventory database 221 may be located in any location suitable for production inventory database 221 to store information for production computing system 220. For example, production inventory database 221 may be located in a cloud environment. In general, production inventory database 221 stores production unit inventory 222, which includes yard check data 125 and images/videos received from yard check sources 120 that has been approved by automatic yard checker module 211.

Network 230 allows communication between and amongst the various components of intermodal inventory management system 200. This disclosure contemplates network 230 being any suitable network operable to facilitate communication between the components of intermodal inventory management system 200. Network 230 may include any interconnecting system capable of transmitting audio, video, signals, data, messages, or any combination of the preceding. Network 230 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication network, a Zigbee network, and/or any other suitable network.

User computing system 240 can be any appropriate system or device that allows a user to interact with intermodal inventory management system 200. User computing system 240 may be a mobile device, a smartphone, a tablet computing device, a personal computing device, a laptop computing device, a desktop computing device, a computer system of a vehicle, a personal digital assistant (PDA), a smart watch, another type of wired and/or wireless computing device, or any part thereof. In some embodiments, user computing system 240 includes an electronic display 242 such as computer or smartphone screen. In some embodiments, user computing system 240 may be configured to provide an interface (e.g., GUI 244) that can be structured to facilitate an operator interacting with intermodal inventory management system 200, e.g., via network 230, to execute and leverage the features provided by intermodal inventory management system 200 and automatic yard checker module 211.

Figure 4:
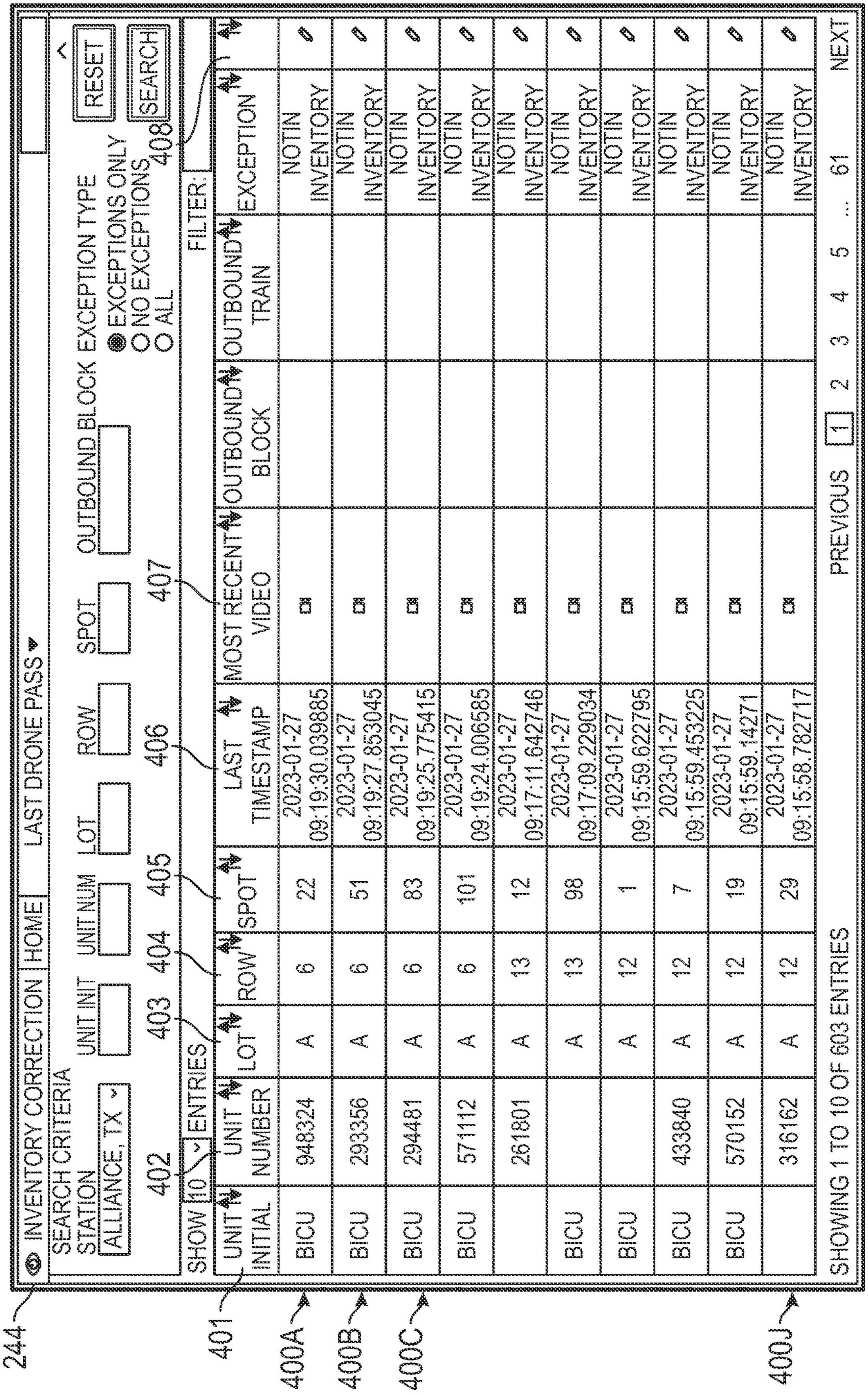
FIG. 4 is a screenshot of an example graphical user interface that may be displayed by the intermodal inventory management system of FIG. 2, according to particular embodiments.

Graphical user interface (GUI) 244 can be an interface that may be displayed on electronic display 242 of user computing system 240 that can allow a user to view and modify pre-production unit inventory 216 before it is sent for storage in production unit inventory 222. FIG. 4 illustrates an example GUI 244, according to certain embodiments. In this example, GUI 244 displays multiple rows 400 (e.g., 400A-400J) that each display information from yard check data 125 received from yard check sources 120. In some embodiments, each row 400 includes a unit initial 401, a unit number 402, a lot location 403, a row location 404, a spot location 405, a last timestamp 406, a user-selectable view element 407, and a user-selectable edit element 408. For example, row 400A includes a unit initial 401 of "BICU," a unit number 402 of "948324," a lot location 403 of "A," a row location 404 of "6," a spot location 405 of "22," and a last timestamp 406 of "2023-01-27 09:19:30.039885." As another example, row 400B includes a unit initial 401 of "BICU," a unit number 402 of "293356," a lot location 403 of "A," a row location 404 of "6," a spot location 405 of "51," and a last timestamp 406 of "2023-01-27 09:19:27.853045." Unit initials 401 and unit numbers 402 are portions of unit identifications 310 of shipping containers 110 as determined by yard check sources 120 and transmitted to computing system 210 via yard check data 125. Lot locations 403, row locations 404, and spot locations 405 are the locations of shipping containers 110 as determined by yard check sources 120 and transmitted to computing system 210 via yard check data 125. Last timestamps 406 are times at which yard check sources 120 captured the data in unit initials 401, unit numbers 402, lot locations 403, row locations 404, and spot locations 405.

In some embodiments, GUI 244 includes user-selectable view elements 407 that allow users to view videos or images of shipping container 110 that were captured by yard check sources 120. For example, when a yard check source 120 captures a video or images of a shipping container 110 and performs OCR on an image 320 in order to determine unit identification 310, it may transmit the video or image 320 along with unit identification 310 to computing system 210 in yard check data 125. A user may then select user-selectable view element 407 in order to view the video or image 320 of the shipping container 110 within GUI 244. This may allow the user to quickly and easily verify the information for shipping container 110 displayed in unit initials 401 and unit numbers 402. In addition, if a user determines that errors exist in the information within a particular row 400, the user may select user-selectable edit element 408 within that row 400 in order to modify the information. For example, if a user views a video by selecting user-selectable view element 407 in row 400A and determines that unit number 402 for row 400A should be "948824" instead of "948324," the user may select user-selectable view element 407 in row 400A and then manually change unit number 402 for row 400A to "948824." As a result, data within pre-production unit inventory 216 may be easily reviewed and verified before being stored in production unit inventory 222.

The functional blocks, and components thereof, of intermodal inventory management system 200 of embodiments of the present disclosure may be implemented using processors, electronics devices, hardware devices, electronics components, logical circuits, memories, software codes, firmware codes, etc., or any combination thereof. For example, one or more functional blocks, or some portion thereof, may be implemented as discrete gate or transistor logic, discrete hardware components, or combinations thereof configured to provide logic for performing the functions described herein. Additionally, or alternatively, when implemented in software, one or more of the functional blocks, or some portion thereof, may comprise code segments operable upon a processor to provide logic for performing the functions described herein.

Various components of intermodal inventory management system 200 may illustrated as single and separate components. However, it will be appreciated that each of the various illustrated components may be implemented as a single component (e.g., a single application, server module, etc.), may be functional components of a single component, or the functionality of these various components may be distributed over multiple devices/components. In such embodiments, the functionality of each respective component may be aggregated from the functionality of multiple modules residing in a single, or in multiple devices.

Further, the functionalities described with reference to each of the different functional blocks of intermodal inventory management system 200 described herein are provided for purposes of illustration, rather than by way of limitation and that functionalities described as being provided by different functional blocks may be combined into a single component or may be provided via computing resources disposed in a cloud-based environment accessible over a network, such as one of network 230.

Figure 5:
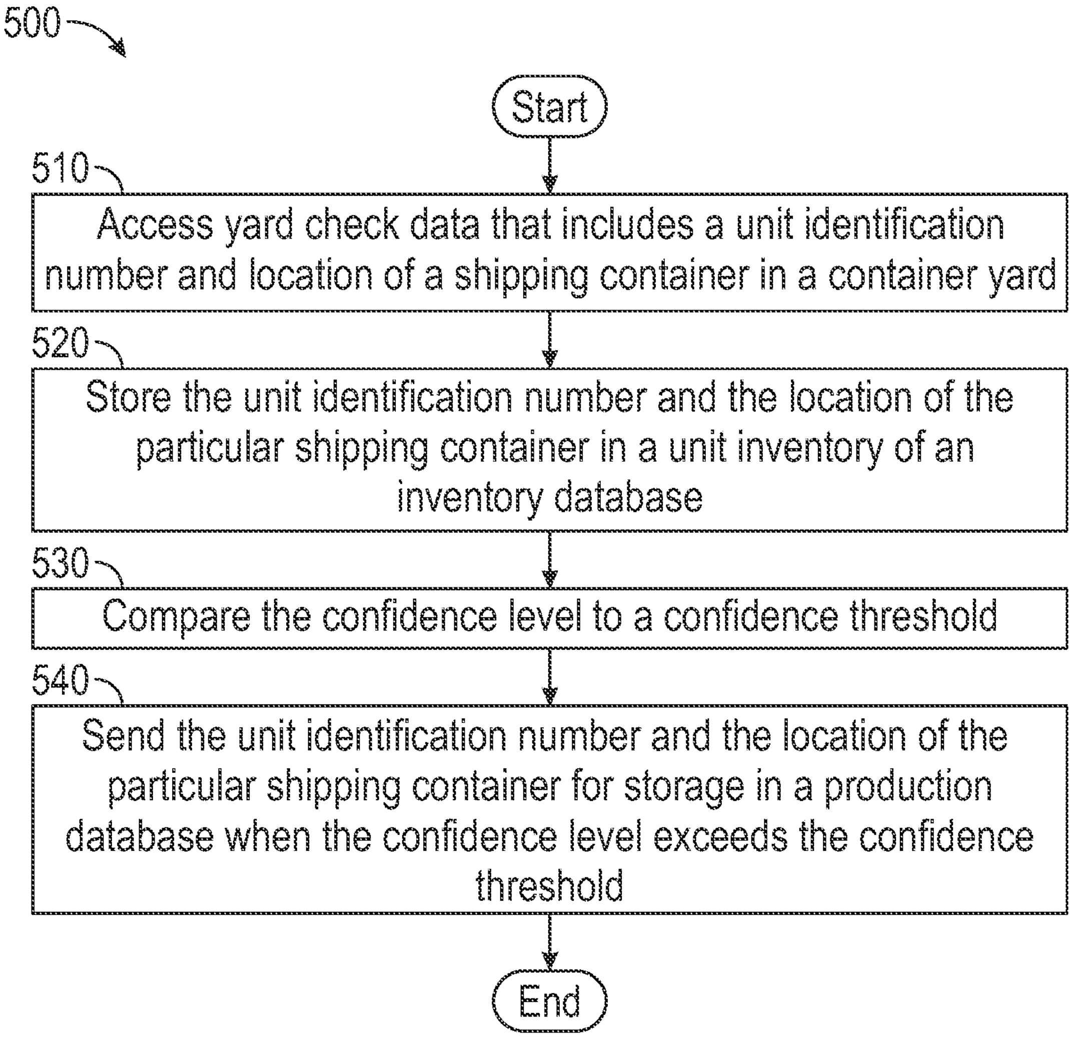
FIG. 5 is a flow diagram illustrating an example method for managing intermodal inventory, according to particular embodiments.

FIG. 5 is a flow diagram illustrating an example method 500 for managing intermodal inventory, according to certain embodiments. In some embodiments, the functions illustrated in the example blocks shown in FIG. 5 may be performed by intermodal inventory management system 200 of FIG. 2 according to embodiments herein. In some embodiments, the operations of method 500 may be stored as instructions that, when executed by one or more processors, cause the one or more processors to perform the operations of method 500.

Method 500 may begin in step 510. In step 510, method 500 accesses yard check data received from a plurality of sources. In some embodiments, the yard check data can be yard check data 125 and the plurality of sources are yard check sources 120. The yard check sources may include one or more of a fixed camera; a camera affixed to a ground vehicle, a camera affixed to an aerial vehicle, and a device coupled to one of a plurality of shipping containers. In some embodiments, the yard check data includes a unit identification number of a particular shipping container of the plurality of shipping containers, a location of the particular shipping container within a container yard, and a confidence level. The unit identification number may be unit identification 310. The location may include a lot identification such as lot 101, a row identification such as row 102, and a slot identification such as spot 103.

In some embodiments, the yard check data of step 510 can be received via a series of message from the yard check sources. In some embodiments, the messages are messages of a distributed event streaming platform. In some embodiments, the distributed event streaming platform can be APACHE KAFKA.

In some embodiments, steps 520-540 are performed by method 500 for each particular message received from each particular yard check source. In step 520, method 500 stores the unit identification number and the location of the particular shipping container accessed in step 510 in a unit inventory of an inventory database. In some embodiments, the unit inventory can be pre-production unit inventory 216. In some embodiments, the inventory database can be pre-production inventory database 214.

In step 530, method 500 compares the confidence level of the particular message received in step 510 to a confidence threshold for the particular source. In some embodiments, the confidence threshold can be one of confidence thresholds 212. In some embodiments, step 530 includes first identifying a particular confidence threshold that corresponds to the source that supplied the yard check data in step 510. For example, if an aerial yard check source supplied the yard check data, method 500 may look up the confidence threshold for the aerial yard check source. After identifying the appropriate confidence threshold, method 500 may then compare the confidence level of the particular message received in step 510 to the identified confidence threshold. As a specific example, step 530 may include determining whether the confidence level of the particular message received in step 510 can be greater than or equal to the identified confidence threshold.

At step 540, method 500 electronically communicates the unit identification number and the location of the particular shipping container accessed in step 510 for storage in a production database when the confidence level of the particular message can be determined in step 530 to exceed the confidence threshold for the particular source. In some embodiments, step 540 includes communicating the unit identification number and the location of the particular shipping container across a communications network. In some embodiments, the production database can be production inventory database 221 of production computing system 220. After step 540, some embodiments of method 500 may end.

In some embodiments, method 500 may further include providing a user interface for display on an electronic display. In some embodiments, the user interface can be GUI 244 and the electronic display can be electronic display 242 of user computing system 240. In some embodiments, the user interface can be configured to display at least a portion of the unit inventory from the inventory database and permit user modification of the unit inventory. In some embodiments, the user interface can be further configured to provide, for each particular shipping container, a user-selectable element configured to display an image or a video of the shipping container within the container yard.

In some embodiments, method 500 may further include analyzing the particular source that supplied the yard check data of step 510 against a plurality of hierarchy rules. In some embodiments, the hierarchy rules are hierarchy rules 213. Method 500 may also electronically communicate, across a communications network, the unit identification number and the location of the particular shipping container of step 510 for storage in the production database when the analysis of the particular source against the plurality of hierarchy rules indicates that the particular source can be at a superior position according to the hierarchy rules than a different source that previously sent yard check data for the particular shipping container.

In some embodiments, method 500 may optionally include one or more steps to verify that a unit identification 310 (e.g., unit initial 401 and unit number 402) in a particular message from yard check source 120 may already be in pre-production unit inventory 216 prior to performing steps 520-540. In these embodiments, if unit identification 310 is already in pre-production unit inventory 216, method 500 may proceed to steps 520-540. If unit identification 310 is not already in pre-production unit inventory 216, method 500 may perform one or more steps to modify unit initial 401 or unit number 402. For example, given a particular set of environmental conditions, mistaking an "I" for a "T," mistaking a "D" for an "O" or a "U," and mistaking an "8" for a "6" are possible occurrences when Optical Character Recognition (OCR) is used by yard check source 120 to determine unit identification 310 from an image or video. To address such mistakes in unit identification 310, method 500 may perform one or more steps to change one or more letters/numbers within unit identification 310 to match existing entries in pre-production unit inventory 216. For example, if unit identification 310 is "PRLU81355" but an existing unit in pre-production unit inventory 216 has an identification of "PRIU81355," method 500 may change the "L" to an "I" to match the existing entry in pre-production unit inventory 216. Once the changes to unit identification 310 are made and verified to match an existing unit in pre-production unit inventory 216, method 500 may then proceed to steps 520-540.

In some embodiments, method 500 may optionally perform one or more steps to ignore small location changes for a particular shipping container 110. As an example, method 500 may ignore yard check data 125 that indicates that a particular shipping container 110 has moved over one spot 103 from a previous spot 103. As a particular example, consider a scenario where yard check source 120A first sends yard check data 125 that indicates that shipping container 110A is located in lot/row/spot of A-1-1. At a later time, yard check source 120A then sends yard check data 125 that indicates that shipping container 110A is located in lot/row/spot of A-1-2. Method 500 may ignore the updated location of A-1-2 for shipping container 110A since the location changed by only one spot. This may alleviate problems caused by inaccurate determinations of unit locations by yard check source 120. The threshold for ignoring small location changes for shipping containers 110 may be any appropriate value (e.g., two spots on either side of an original spot 103) and may be user configurable.

In operation, in certain embodiments, the system can instantiate logic to automatically "heal" the data and improve the overall system by modifying data from a source to reduce data errors and inconsistencies from received information. The design of the AYC system, e.g., system 200, can be to allow for these "not in inventory" units to be auto-corrected or to improve the data using known information in the AYC system. In some embodiments, the "Hierarchy rules" can allows the data to flow to a production inventory system from the most accurate source. For example, if a less accurate source was the first to provide Lot/Row/Spot data to an AYC system and the information was sent to the production inventory system, it would be the data of record. If a source that is statistically higher in accuracy provides information about that same unit, AYC will supplant the previous data. However, in some embodiments, the logic of system 200 can modify the initial and/or number of the source data in an attempt to change "Not in Inventory" data to a unit that is located in the facility. An audit trail can be created to determine the system 200 changed the data in the Inventory Correction Editor Display. For example, the system 200 can display an indicator identifying the automatic correction and the source from which the automatic correction was made, e.g., "AYC+<Source>." In a situation where the corrected data was received by a Verispot source, the indicator displayed can be, "Verispot+AYC."

Accordingly, in one embodiment, the intermodal inventory management system 200 of FIG. 2 can receive a message from a source and publish the message for processing according to one or more rules. For example, the message can be identified via an AYC+<source> indicator. In another embodiment, the system 200, can consume the message received from the source for a slot-filled event. For example, the slot-filled event can include a unit plus a location. The system 200 can then determine whether the slot-filled event includes a structure and/or is required to be field complaint. If the system 200 determines that the slot filled event is a structure the system 200 then determines whether the structure is in inventory if the unit is not in inventory, the system 200 determines whether the data is old or late.

If the data is neither old nor late, the system 200 can determine whether to modify the number of the unit or other related data. Such modification can be automatic or manual.

If the system 200 determines that the number other related data of the unit should be modified, the system 200 can recheck whether the unit whose data is to be modified is now listed in inventory. If the unit is not in inventory, the system 200 ends the rule processing for the message. If the unit is updated to be listed in inventory, the system 200 can republish the message for processing according to the aforementioned operations.

If the data is old or late, the system 200 can reconcile the PYC/AYC. The system 200 can then determine whether it is necessary to respond to the source. If it is necessary to respond to the source the unit is identified as a unit exception. If it is unnecessary to respond to the source, the system 200 can and the rule processing for the message in AYC. In this way, the expectations for a source are that: (i) the source will no longer send known that data, and (ii) the source will learn/train from exceptions to improve the system 200.

If the unit was initially identified as being listed in inventory, the system 200 can determine whether to update the AYC table using hierarchy business rules. If the AYC table is to be updated using hierarchy business rules, the system 200 can either send the message, including the unit and location, to a secondary system, such as a production inventory system, or determine whether to respond to the source promulgating the message.

Figure 6:
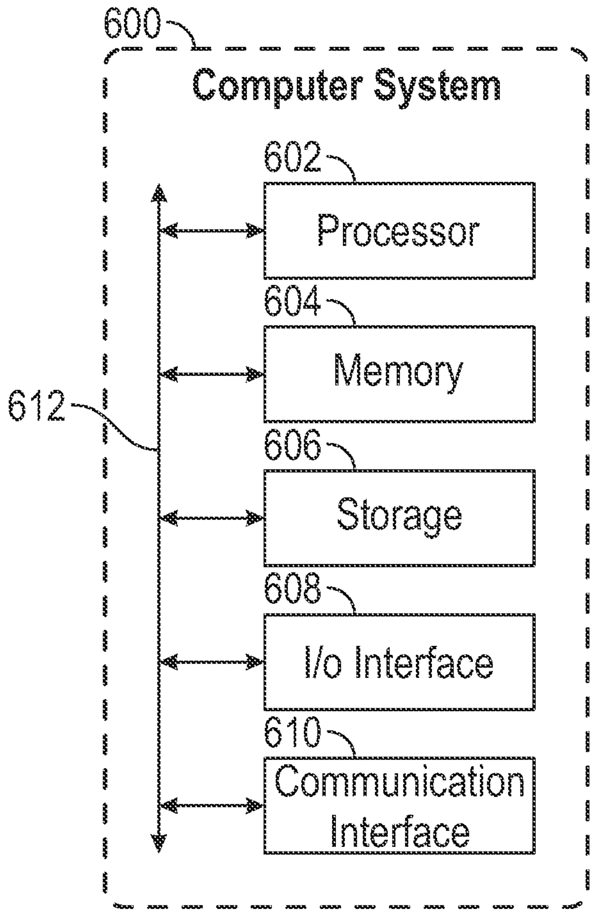
FIG. 6 is an example computer system that can be utilized to implement aspects of the various technologies presented herein, according to particular embodiments.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example, and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example, and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example, and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example, and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 can be non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example, and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example, and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Persons skilled in the art will readily understand that advantages and objectives described above would not be possible without the particular combination of computer hardware and other structural components and mechanisms assembled in this inventive system and described herein. Additionally, the algorithms, methods, and processes disclosed herein improve and transform any general-purpose computer or processor disclosed in this specification and drawings into a special purpose computer programmed to perform the disclosed algorithms, methods, and processes to achieve the aforementioned functionality, advantages, and objectives. It will be further understood that a variety of programming tools, known to persons skilled in the art, are available for generating and implementing the features and operations described in the foregoing. Moreover, the particular choice of programming tool(s) may be governed by the specific objectives and constraints placed on the implementation selected for realizing the concepts set forth herein and in the appended claims.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). For example, the terms "processor" and "controller" can be a class of structures, rather than one specific structure, and may be defined with functional terms, but that does not make it means-plus-function. Even under the broadest reasonable interpretation, in light of this paragraph of this specification, the claims are not intended to invoke 35 U.S.C. § 112(f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the disclosures can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various embodiments of the present disclosure may be combined or performed in ways other than those illustrated and described herein.

Functional blocks and modules disclosed herein may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium can be coupled to the processor such that the processor can read information from, and write information to, the storage medium. In the alternative, the storage medium may be integral to the processor. The processor and the storage medium may reside in an ASIC. The ASIC may reside in a user terminal, base station, a sensor, or any other communication device. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. The terms Disk and disc can include compact disc (CD), laser disc, optical disc, digital versatile disc (DVD), floppy disk, and Blu-ray disc where disks usually reproduce data magnetically, while discs usually reproduce data optically with lasers. Combinations of the above should also be included within the scope of computer-readable media.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present disclosure, processes, machines, manufacture, compositions of matter, means, methods, or steps, presently existing or later to be developed that perform substantially the same function, in substantially the same way, or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A system comprising:
- an inventory database storing a unit inventory;
- one or more memory units storing a plurality of confidence thresholds; and
- one or more computer processors communicatively coupled to the inventory database and the one or more memory units and configured to:
- access a plurality of messages received from a plurality of yard check sources, wherein the plurality of messages comprises images from one or more of the plurality of yard check sources;
- analyze the images using a machine learning algorithm to determine yard check data, wherein the determined yard check data comprises:
  - a unit identification number of a particular shipping container of a plurality of shipping containers;
  - a location of the particular shipping container within a container yard; and
  - a confidence level associated with the identification number of the particular shipping container; and
- for each particular message received from each particular yard check source:
  - store the unit identification number and the location of the particular shipping container in the unit inventory of the inventory database;
  - compare the confidence level of the particular message to a confidence threshold for the particular yard check source;
  - analyze the particular yard check source against a plurality of hierarchy rules; and
  - automatically store the unit identification number and the location of the particular shipping container in a production database when:
    - the confidence level of the particular message exceeds the confidence threshold for the particular yard check source; and
    - the analysis of the particular yard check source against the plurality of hierarchy rules indicates that the particular yard check source is at a superior position according to the hierarchy rules than a different yard check source that previously sent yard check data for the particular shipping container.

2. The system of claim 1, wherein the plurality of yard check sources comprises one or more of:
- a fixed camera;
- a camera affixed to a ground vehicle;
- a camera affixed to an aerial vehicle; and
- a device coupled to one of the plurality of shipping containers.

3. The system of claim 1, wherein the plurality of messages are received from the plurality of yard check sources via a distributed event streaming platform.

4. The system of claim 1, wherein the one or more computer processors are further configured to provide a user interface for display on an electronic display, the user interface configured to:
- display at least a portion of the unit inventory from the inventory database; and
- permit user modification of the unit inventory.

5. The system of claim 4, the user interface further configured to provide, for each particular shipping container, a user-selectable element configured to display an image or a video of the shipping container within the container yard.

6. The system of claim 1, wherein the location of each particular shipping container in each message received from the plurality of yard check sources comprises:
- a lot identification;
- a row identification; and
- a spot identification.

7. A method by a computing system, the method comprising:
- accessing, by one or more computer processors, a plurality of messages received from a plurality of sources, wherein the plurality of messages comprises images from one or more of the plurality of yard check sources;
- analyzing, by the one or more computer processors, the images using a machine learning algorithm to determine yard check data, wherein the determined yard check data comprises:
  - a unit identification number of a particular shipping container of a plurality of shipping containers;
  - a location of the particular shipping container within a container yard; and
  - a confidence level; and
- for each particular message received from each particular yard check source:
  - storing, by the one or more computer processors, the unit identification number and the location of the particular shipping container in a unit inventory of an inventory database;
  - comparing, by the one or more computer processors, the confidence level of the particular message to a confidence threshold for the particular yard check source;
  - analyzing, by the one or more computer processors, the particular yard check source against a plurality of hierarchy rules; and
  - automatically storing, by the one or more computer processors, the unit identification number and the location of the particular shipping container in a production database when:
    - the confidence level of the particular message exceeds the confidence threshold for the particular source; and the analysis of the particular yard check source against the plurality of hierarchy rules indicates that the particular yard check source is at a superior position according to the hierarchy rules than a different yard check source that previously sent yard check data for the particular shipping container.

8. The method of claim 7, wherein the plurality of sources comprises one or more of:
a fixed camera;
a camera affixed to a ground vehicle;
a camera affixed to an aerial vehicle; and
a device coupled to one of the plurality of shipping containers.

9. The method of claim 7, wherein the yard check data is received from the plurality of sources via a plurality of messages from a distributed event streaming platform.

10. The method of claim 7, further comprising providing a user interface for display on an electronic display, the user interface configured to:
display at least a portion of the unit inventory from the inventory database; and
permit user modification of the unit inventory.

11. The method of claim 10, the user interface further configured to provide, for each particular shipping container, a user-selectable element configured to display an image or a video of the shipping container within the container yard.

12. The method of claim 7, wherein the location of each particular shipping container in each message received from the plurality sources comprises:
a lot identification;
a row identification; and
a spot identification.

13. One or more computer-readable non-transitory storage media embodying instructions that, when executed by a processor, cause the processor to perform operations comprising:
accessing a plurality of messages received from a plurality of sources, wherein the plurality of messages comprises images from one or more of the plurality of yard check sources;
analyzing the images using a machine learning algorithm to determine yard check data, wherein the determined yard check data comprises:
a unit identification number of a particular shipping container of a plurality of shipping containers;
a location of the particular shipping container within a container yard; and
a confidence level; and
for each particular message received from each particular source:
storing the unit identification number and the location of the particular shipping container in a unit inventory of an inventory database;
comparing the confidence level of the particular message to a confidence threshold for the particular source;
analyzing the particular yard check source against a plurality of hierarchy rules; and
automatically storing electronically communicating, across a communications network, the unit identification number and the location of the particular shipping container for storage in a production database when:
the confidence level of the particular message exceeds the confidence threshold for the particular source; and
the analysis of the particular yard check source against the plurality of hierarchy rules indicates that the particular yard check source is at a superior position according to the hierarchy rules than a different yard check source that previously sent yard check data for the particular shipping container.

14. The one or more computer-readable non-transitory storage media of claim 13, wherein the plurality of sources comprises one or more of:
a fixed camera;
a camera affixed to a ground vehicle;
a camera affixed to an aerial vehicle; and
a device coupled to one of the plurality of shipping containers.

15. The one or more computer-readable non-transitory storage media of claim 13, wherein the yard check data is received from the plurality of sources via a plurality of messages from a distributed event streaming platform.

16. The one or more computer-readable non-transitory storage media of claim 13, the operations further comprising providing a user interface for display on an electronic display, the user interface configured to:
display at least a portion of the unit inventory from the inventory database; and
permit user modification of the unit inventory.

17. The one or more computer-readable non-transitory storage media of claim 16, the user interface further configured to provide, for each particular shipping container, a user-selectable element configured to display an image or a video of the shipping container within the container yard.

18. The one or more computer-readable non-transitory storage media of claim 13, wherein the location of each particular shipping container in each message received from the plurality sources comprises:
a lot identification;
a row identification; and
a spot identification.

* * * * *